US011272804B2

(12) United States Patent
Webster et al.

(10) Patent No.: US 11,272,804 B2
(45) Date of Patent: Mar. 15, 2022

(54) BEVERAGE BREWING DEVICE FOR BREWING AND REMOVAL OF DIFFERENT SIZED FLAVORED BEVERAGE PACKETS (POD)

(71) Applicants: Joseph P. Webster, St. Charles, MO (US); David L. Brandsma, St. Charles, MO (US)

(72) Inventors: Joseph P. Webster, St. Charles, MO (US); David L. Brandsma, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 573 days.

(21) Appl. No.: 16/350,609

(22) Filed: Dec. 7, 2018

(65) Prior Publication Data

US 2019/0150655 A1    May 23, 2019

Related U.S. Application Data

(63) Continuation-in-part of application No. 14/998,711, filed on Feb. 4, 2016, now Pat. No. 10,687,655, and a continuation-in-part of application No. 14/544,650, filed on Jan. 29, 2015, now Pat. No. 9,788,682.

(60) Provisional application No. 62/708,544, filed on Dec. 12, 2017, provisional application No. 62/176,976, filed on Mar. 3, 2015, provisional application No. 61/966,495, filed on Feb. 25, 2014.

(51) Int. Cl.
| | |
|---|---|
| *A47J 31/36* | (2006.01) |
| *A47J 31/06* | (2006.01) |
| *B65D 85/804* | (2006.01) |
| *A47J 31/44* | (2006.01) |
| *A47J 31/46* | (2006.01) |

(52) U.S. Cl.
CPC ....... *A47J 31/3633* (2013.01); *A47J 31/0668* (2013.01); *A47J 31/3638* (2013.01); *A47J 31/3676* (2013.01); *B65D 85/8052* (2020.05); *A47J 31/446* (2013.01); *A47J 31/465* (2013.01)

(58) Field of Classification Search
CPC . A47J 31/3638; A47J 31/3623; A47J 31/3676
USPC .............................................. 99/289 R, 295
See application file for complete search history.

(56) References Cited

U.S. PATENT DOCUMENTS

| | | | |
|---|---|---|---|
| 5,325,765 A | 7/1994 | Sylvan et al. | |
| 5,794,519 A * | 8/1998 | Fischer | A47J 31/0668 99/295 |
| 5,840,189 A | 11/1998 | Sylvan et al. | |
| 6,079,315 A | 6/2000 | Beaulieu et al. | |
| 6,182,544 B1 | 2/2001 | Beaulieu et al. | |
| 6,510,783 B1 * | 1/2003 | Basile | A47J 31/3633 99/281 |
| 6,606,938 B2 | 8/2003 | Taylor | |

(Continued)

*Primary Examiner* — Reginald Alexander
(74) *Attorney, Agent, or Firm* — Paul M Denk (57) ABSTRACT

A brewing system for brewing a single flavored beverage of different varieties is disclosed which comprises a holder for receiving a flavored beverage packet (pod) of different sizes, said holder being a technically cantilevered receptacle to hold the flavored beverage packet (pod) beverage in a brewing position, a hinged cover which is secured by a latch, and introduces water in the sealed and enclosed brewing area to produce a flavored beverage drink that flows through the beverage packet and into a receptacle for consumption.

10 Claims, 10 Drawing Sheets

(56) References Cited

U.S. PATENT DOCUMENTS

| | | |
|---|---|---|
| 6,655,260 B2 | 12/2003 | Lazaris et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,904,840 B1 * | 6/2005 | Pfeifer ................ A47J 31/0668 99/289 R |
| 7,165,488 B2 | 1/2007 | Bragg et al. |
| 7,210,401 B1 | 5/2007 | Rolfes et al. |
| 7,347,137 B2 | 3/2008 | Lafond et al. |
| 7,513,192 B2 | 4/2009 | Sullivan et al. |
| 8,733,231 B2 * | 5/2014 | Turi .................... A47J 31/3638 99/295 |
| 9,332,874 B2 | 6/2016 | Webster et al. |
| 9,788,682 B2 | 10/2017 | Brandsma et al. |
| 2013/0340626 A1 | 12/2013 | Oh |
| 2015/0059590 A1 * | 3/2015 | Xue ...................... A47J 31/407 99/295 |
| 2016/0015766 A2 | 6/2016 | Brandsma et al. |

\* cited by examiner

BEVERAGE BREWING DEVICE FOR BREWING AND REMOVAL OF DIFFERENT SIZED FLAVORED BEVERAGE PACKETS (POD)

CROSS REFERENCE TO RELATED APPLICATIONS

This application claims priority to the provisional patent application having Ser. No. 62/708,544, filed on Dec. 12, 2017, which is a continuation-in-part of the non-provisional patent application having Ser. No. 14/998,711, filed on Feb. 4, 2016, which claims priority to the provisional patent application having Ser. No. 62/176,976, filed on Mar. 3, 2015; this application also claims priority as a continuation-in-part of the non provisional patent application having Ser. No. 14/544,650, filed on Jan. 29, 2015, and which application claims priority to the provisional patent application having Ser. No. 61/966,495, filed on Feb. 25, 2014;

FIELD OF THE DISCLOSURE

This invention relates to a device for brewing a beverage, and more specifically pertains to a beverage brewing device for brewing a different variety of beverages from packets or pods, and relates to the mechanism applied for removal of the brewing packet once the beverage has been brewed.

BACKGROUND OF THE INVENTION

One popular brewing system includes a single serve system in which a packet of coffee, tea, produce from a pod, is inserted into a system to brew a single cup of beverage. The brewing system has a holder or receptacle to receive the coffee or tea packet. A top cover is adapted to be lowered onto the top of the beverage packet, in preparation for a brewing cycle. The top cover has a series of channels which directs a liquid, such as hot water onto the top of the beverage packet, to commence brewing. Channels in the top cover are also configured to deliver a liquid, such as hot water, through the channels in the top cover, into and through the beverage packet, and deliver the beverage out of the exist hole or aperture in the bottom of the holder, out through a delivery aperture, for discharge into a cup or other container. The system, as known, also has a water container connected to the water channels in the top cover for providing the heated water to the packet to brew the beverage. The delivery spout in the bottom of the holder is used to funnel a brewed beverage out of the brewing system. Underneath the delivery aperture or spout is a cup that is placed there to capture the brewed beverage. In this manner, a single serving of a beverage is conveniently brewed. As can be appreciated, once a single serving of beverage is brewed, the used packet or pod is removed from the brewing system and another packet or pod is inserted therein for the next brewing operation to take place. All this can be done automatically.

Some variations of the brewing system allows various size beverages to be brewed. For example, if an individual wants to brew a ten ounce cup of coffee, then a button is selected to indicate that the brewing system should provide ten ounces of heated water through the capsule to brew only ten ounces of coffee. If an individual wants to brew twelve ounces of a beverage, another button on the brewing system is selected to have the brewing system only brew twelve ounces of the beverage. These are examples of prior art type of beverage brewing devices.

SUMMARY OF THE DISCLOSURE

In one form of the present disclosure, a brewing system for brewing a single cup beverage packet or pod of different sizes to a vending machine is disclosed, and which comprises a holder for receiving the packets or pods of differing sizes, and an eject system connected to the packer holder for pivoting the packet holder to eject that capsule into a waste container. A lift arm having a slide boss, and an eject mechanism for engaging the slide boss and connected to the packer holder for pivoting the packet holder to eject the packet or pod out of the holder and into a waste receptacle.

In light of the foregoing comments, it will be recognized that the present disclosure provides a device for brewing a single cup packet or pod beverage through a vending machine and the device is equipped to dispense and dispose of the coffee packets or pods once a brewing operation has been completed.

The present disclosure provides a device for brewing a beverage that can automatically dispose of a beverage packet or pod after a brewing operation has been completed to allow a different beverage packet to be placed into the device for the next brewing operation.

In light of the foregoing comments, it would be recognized that the present disclosure provides a device for brewing a single cup packet or pod of a beverage through a vending machine and the device is equipped to dispense and dispose of the coffee packets or pods once a brewing operation has been completed.

This disclosure also is directed to a device where brewing a beverage that accepts packets or pods and disposes the different variety of pods once a brewing operation has been completed.

This disclosure provides a device for brewing a beverage that automatically resets itself to receive a new beverage packet or pod once a used pod has been disposed of automatically by the device.

This disclosure also provides a device from brewing a single cup of beverage from a packet or pod through a vending machine that is simple of structure and easy to use.

In summary, this device incorporates structure that can be included into a vending machine or beverage brewer, that can achieve the various objects and purposes as just previously described. It includes a handle that pivotally attaches onto an upper brew housing, and has a water inlet structured through it, into the upper brew housing, for delivery of heated water to its lower frame, that integrally forms a pod holder, into which a packet or pod of beverage grounds locate, in preparation for a brewing cycle. The upper brew housing may be pivoted upwardly, at the back end of the lower frame, so that when the upper frame is automatically lowered, its upper pod and water outlets align with the pod holder, the two of which are locked into position by a lock latch, that secures the pod holder together, in preparation for delivery of heated water to the device during operations of a brewing cycle.

Following completion of a brewing cycle, and when the upper brew housing is elevated, it pivots relative to the lower frame, and the upper brew housing engages by means of a lift release tab for pivoting a lever arm, having a cam and its frontal edge, that engages with a link connecting with the lower pod holder, and as the pivot continues pivoting said lower pod holder rearwardly, beyond its vertical disposition, that causes the spent pod to fall from its holder and drop into a waste container, for disposal.

The upper and lower pod holders are secured together due to the upper brew housing coming into proximity with the lower frame, to achieve engagement of its lock latch, to secure these components together, and to embrace the packet or pod within the pod holder in preparation for performance of a brewing cycle. The pod holder includes its pod support, that can elevate the pod, while the upper brew housing incorporates the various water outlets that delivers heated water into the region of the pod holder, to brew a beverage from the contained pod or packet, during a brewing cycle.

These and other objects and purposes for the current invention may be considered by those skilled in the art upon review of the description of the invention as provided herein.

BRIEF DESCRIPTION OF THE DRAWINGS

In referring to the drawings:

FIG. 5 is shows the lift movements at the completion of a brew processing showing a spent beverage pod being disposed of;

DETAILED DESCRIPTION OF PREFERRED EMBODIMENTS

Figure 1:
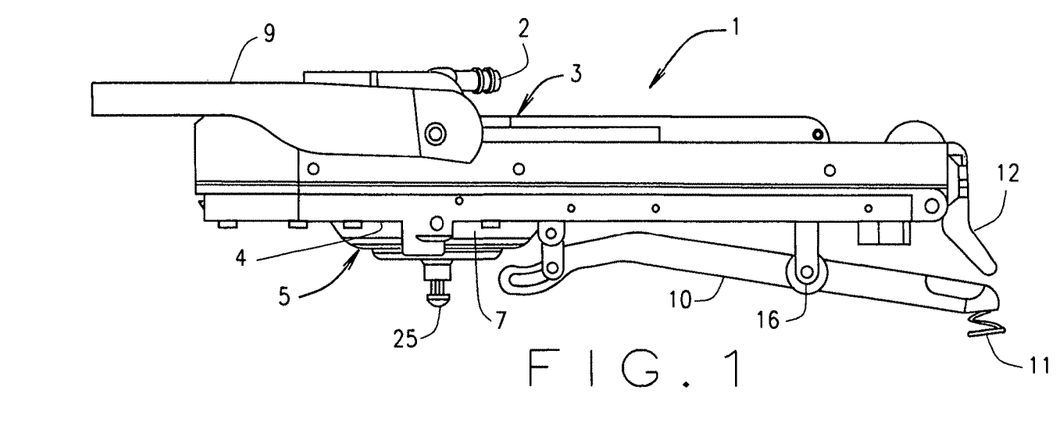
FIG. 1 is a side view of the brewing mechanism for processing a beverage pod during its handling.
Figure 2:
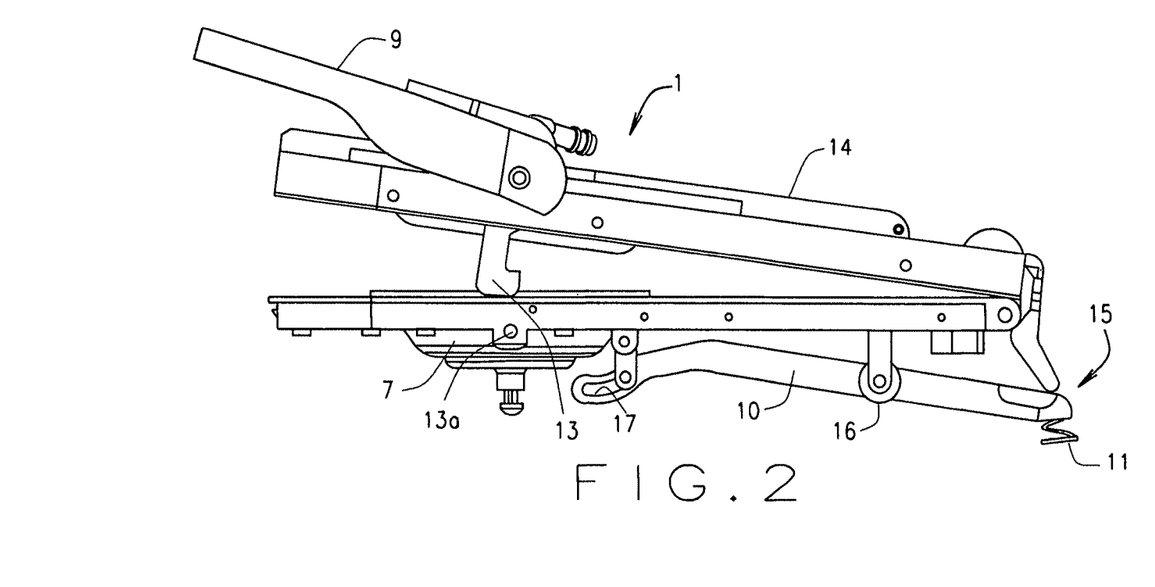
FIG. 2 is a side view of the brewing mechanism showing the upper and lower brew chamber housings.

In referring to the drawings, as explained, FIG. 1 depicts a side view of the brewing mechanism and its cover 1, for a pod of coffee, or other beverage. Hot water enters the water inlet 2, diffuses through the upper pod brewing chamber water outlets 3, flows through the beverage pod 4, usually coffee, as hidden within the pod holder 5, and exits through oversize grooves, as at 6, provided in the lower pod brewing chamber 7, as can be noted. This figure is a side view of the brewing mechanism shown in a closed or idle position, awaiting its application and usage. The mechanism includes a water inlet fitting 2, as noted, used to introduce hot water from a storage tank (not shown) preferably delivered by a pumping mechanism, of the vending machine, into a sealed brewing chamber, and delivers the same through a beverage pod, one as shown at 8, (supported within the pod holder) with the brewed beverage exiting from the brewing chamber as a flavored beverage, as can further be viewed in the cross sectional view as provided in FIG. 6 for the shown idle brewing mechanism, for this invention. FIG. 1 also depicts a lifting handle 9, used to access the brewing chamber, and a lift arm 10, having a lift spring 11 and lift tab 12, which are also shown in an idle position. To initiate a brewing cycle, the brew chamber must first be opened to accept a beverage pod. This can be accomplished, as shown in FIG. 2, as the handle 9 is lifted which then releases the lock latch hooks 13 from engagement upon the pins 13, and allows the upper brew housing 14 to elevate. As the upper brew housing continues its upward travel, the lift tab 12 begins to engage with the lift arm 10, as shown at 15, as noted. The lift arm is mounted on a fixed pivot axis 16 and is supported by a conical lift spring 11, as shown. The rear portion of the lift arm 10 has a linear release tab which is designed to interfere with the lift tab 12 as the brew housing continues to rise. As the interference increases between the lift tab 12 and the lift arm 10, a circular slotted opening in the form of a cam 17, in the front portion of the lift arm interferes with a boss or link 18 attached to the pod holder, inside the circular slotted opening, which causes the pod holder 5 to lift upwardly and rearwardly, as also shown in FIG. 4.

FIG. 2 depicts a side view of the brewing mechanism 1 showing the upper 14 and lower 7 brew chamber housings which are secured by a brew chamber latch 13, which is controlled by the position of the handle.

Figure 4:
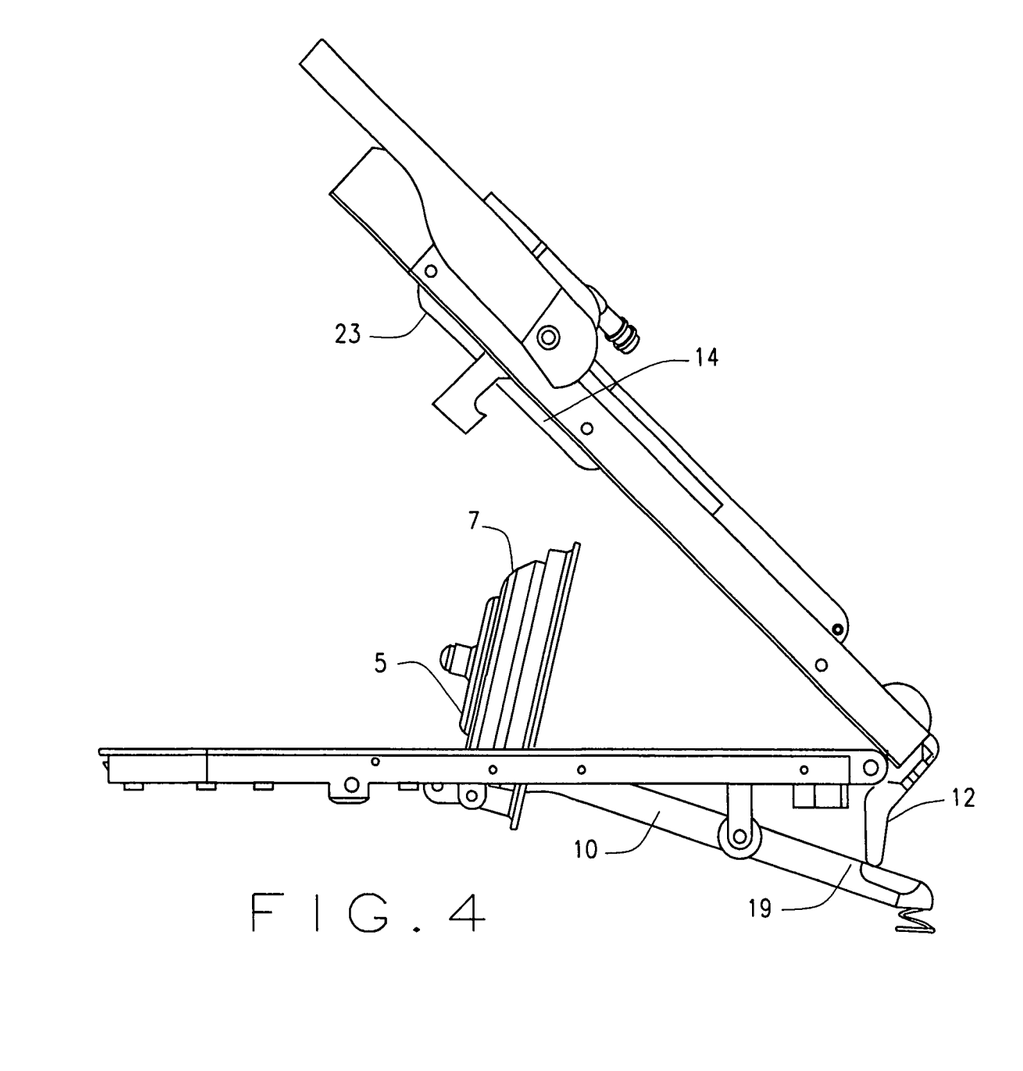
FIG. 4 is discloses the lift tab and the brew chamber lift arm near the end of their engagement.
Figure 5:
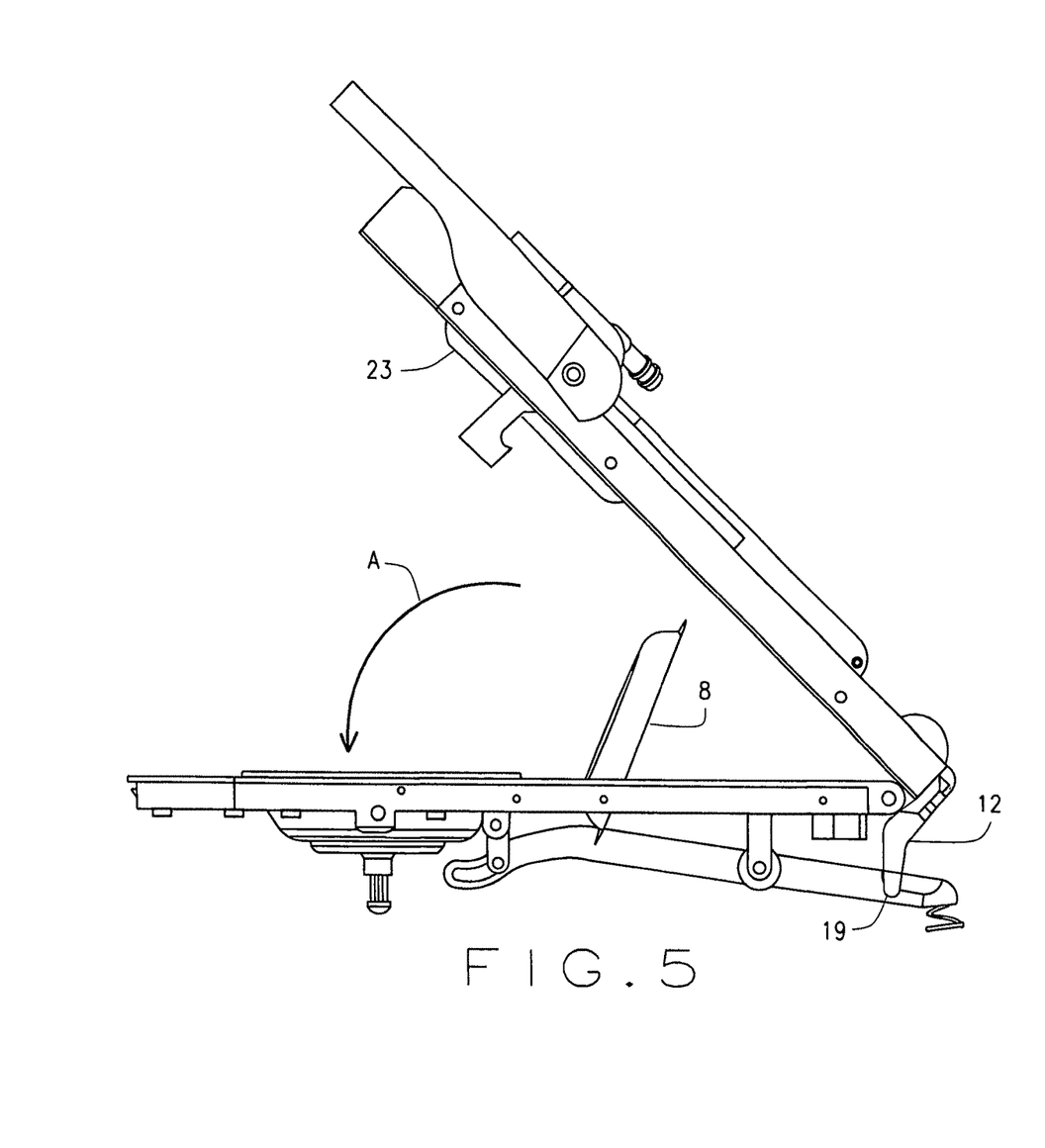

As the upper brew chamber 14 elevates, and the lower brew chamber 7 reaches a position over vertical, as noted in FIG. 4, the end of interference between the lift tab 12 and the lift release tab 19 is reached, and the upward spring force on the conical spring against the lift arm causes the pod holder to initiate a return to a horizontal position, as shown in FIG. 5.

Figure 3:
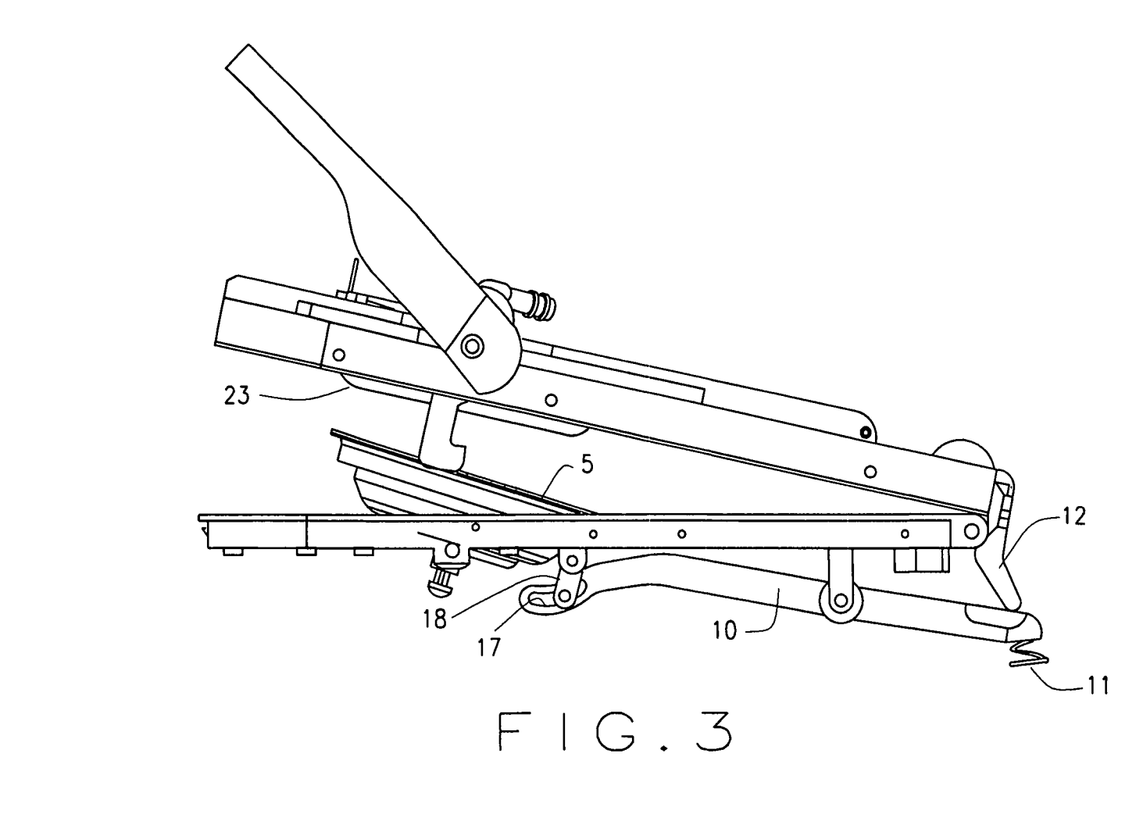
FIG. 3 discloses the lift tab engaging the brew chamber lift arm as the lower pod brew chamber lifts out of the lower brew chamber housing.

FIG. 3 provides a view as the lift tab 12 engages the brew chamber lift arm 10, and causes the lower pod brew chamber 7, to rise out of the lower brew chamber housing 5.

FIG. 4, as stated, discloses when the lift tab 12 and brew chamber lift arm 10 near the end of engagement. The lower brew chamber housing 7 pivots to a position over vertical, as noted. When this occurs, and when these components are in this position, the contents of the lower brew chamber housing and its pod 4 can be released and discharged by gravity and inertia, to a waste container.

As noted in FIG. 5, after the upper reach of the lift is completed, the lift release tab 12 releases from the brew chamber lift arm 10, and the spring force from the spring 11 returns the lower pod brewing chamber to the horizontal position, as noted by the arrow A. The spent coffee pod, as at 8, is then released from the lower pod brewing chamber 7 and is directed into a waste bin (not shown).

At the end of interference between the lift tab 12 and the lift release tab 19, when such is reached, the upward spring force on the conical spring 11 against the lift arm 10 causes the pod holder to return to a horizontal position, as shown in FIG. 5. If the pod holder contains a spent pod, during the lifting process, the pod would be released into a waste container prior to or when reaching the vertical extent of its upward pivot, as noted. When the brew chamber returns to a horizontal position, as shown in FIG. 5, the chamber would now be empty, but ready to receive another fresh beverage pod, in preparation for further brewing.

Figure 6:
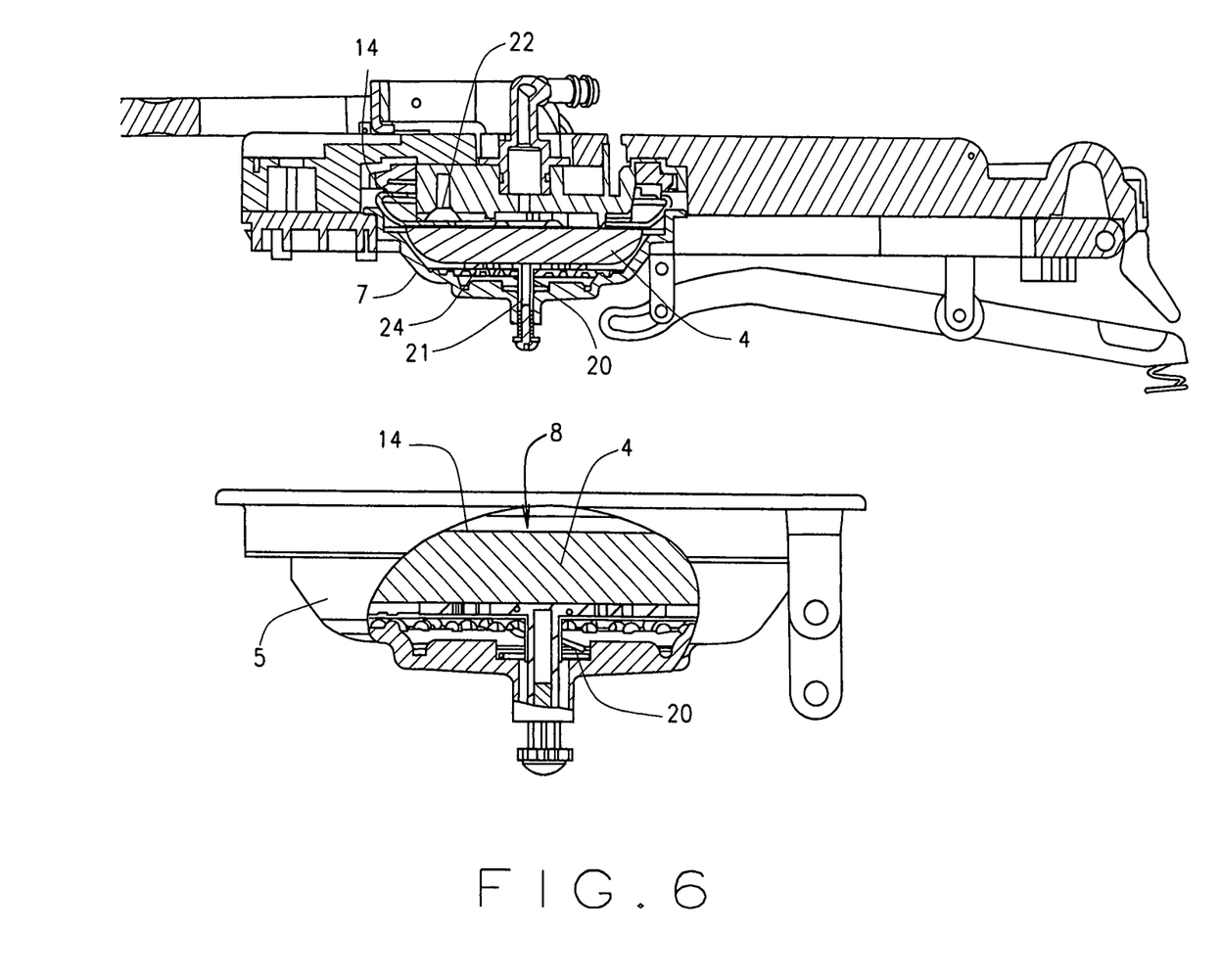
FIG. 6 shows a cross sectional view of the entire brewing mechanism during its setup for a brewing process.

As noted, FIG. 6 depicts a cross-sectional view of the entire brewing mechanism. The conical spring 20 is positioned in between the bottom portion of the pod support 21 and the top surface of the lower pod brewing chamber 7. The coffee pod 4 is placed on top of the pod support 21. This can be done manually, or automatically. When the brew chamber is closed, the pod 4 is forced into the upper pod brewing chamber 14 as the conical spring 20 compresses. This arrangement allows the pod 4 to be pushed against the water outlets 22, by the spring force, as aforesaid, for maximum water distribution to the beverage containing pod 4 and its contents.

After a beverage pod 4 has been placed in the empty brew chamber B, and the upper brew housing is closed by a downward movement of the handle 9 and brew chamber, the latch 13 will lock and the beverage housing is sealed by the engagement of the upper pod seal 23 as previously shown in FIG. 3, and the pod holder 5. The beverage pod is supported by a pod support disk 24 which can slide up and down through the pod holder by means of the attached shaft 25. A conical spring 20 is situated between the pod support disk 24 and the pod holder 5, which pushes the pod support 24 upwards forcing the pod against the water outlets 22 in the upper brew chamber in preparation for a brewing process.

This process for brewing a beverage for multi-sized packets or pods is further illustrated in these cross sectional views of FIGS. 6-11. The pod support 24 and conical spring 20 arrangement as shown in FIG. 6 depicts the pod being forced against the water outlets 22 by the upward spring force, as aforesaid.

Figure 7:
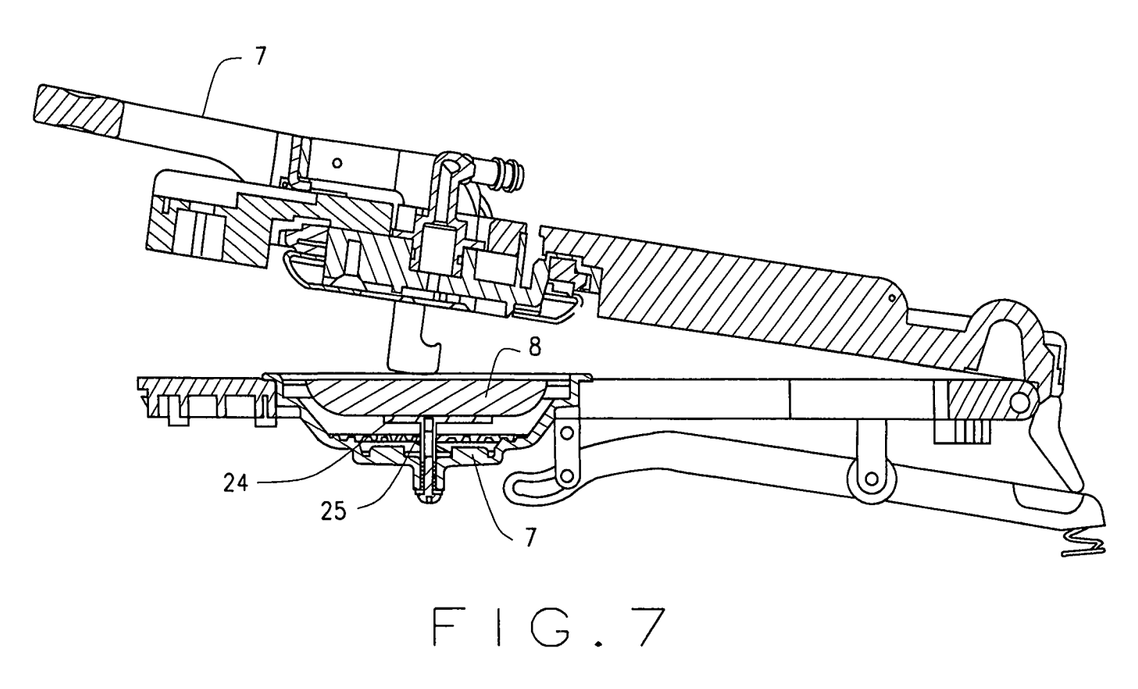
FIG. 7 provides a cross sectional view depicting the handle initiating its lift after completion of a brewing process.

FIG. 7 depicts the cross sectional view of the motion of the handle 7 being automatically lifted up. The lifting force of the conical spring 20 raises the pod support 24 and reduces the contact area of the beverage pod that it has with the lower pod brewing chamber 7. The spent coffee pod 8 is now independent of the lower pod brewing chamber 7 as it is raised out of the lower brew chamber housing, as explained. FIG. 7 depicts this action of the conical spring 20 as the cover is lifted, showing the pod being lifted by the pod support away from the pod holder 7. This action removes any surface tension contact between the damp pod 8 and the pod holder allowing the pod to be independent of the pod holder not only to provide greater efficiency in the brewing of a beverage, but to further assist in the ejection of the pod, once a brewing cycle has been completed.

Figure 8:
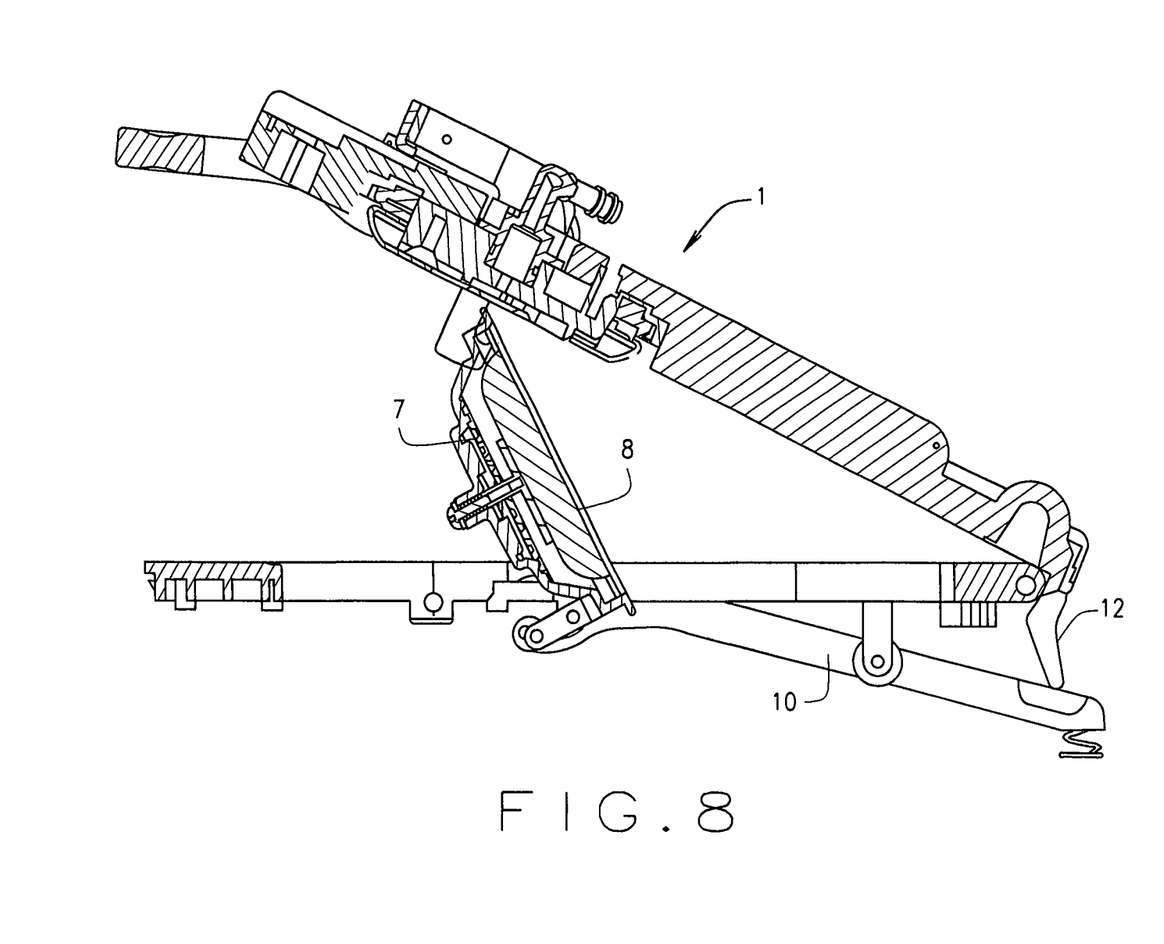
FIG. 8 depicts a cross sectional view, as in FIG. 3, as the lift tab engages the brew chamber lift arm initiating the disposal of a spent pod.
Figure 9:
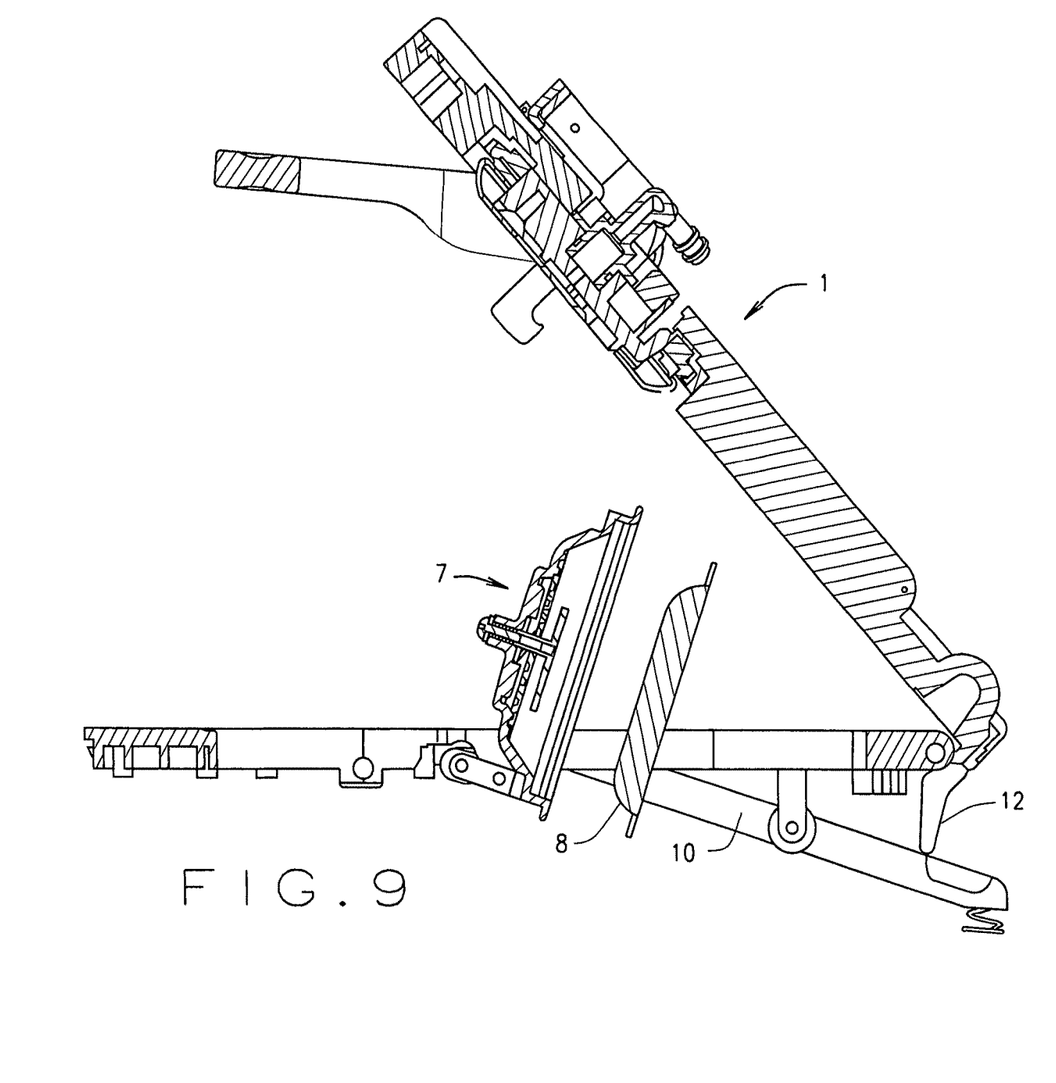
FIG. 9 provides a cross sectional view of FIG. 4, disclosing how the lift tab and brew chamber lift arm are near the end of their engagement, and the lower brew chamber housing pivots to an over vertical position for dispensing of a spent beverage pod.

FIG. 8 depicts a cross sectional view of the assembly of FIG. 3. As the lift tab 12 engages the brew chamber lift arm 10, the lower pod brew chamber 7 rises out of the lower brew chamber housing. Both FIGS. 8 and 9 show the process of how the spent pod 8 is being removed after the brewing process, and when the cover 1 is lifted to insert a new pod therein. As stated, FIG. 9 depicts a cross-sectional view of FIG. 4. As the lift tab 12 and brew chamber lift arm 10 near the end of engagement, the lower brew chamber housing 7 pivots to a position over vertical, as noted. In this position the content of the lower brew chamber housing (pod) 8 can be released by gravity and inertia, for dispensing into a waste bin. These FIGS. 8 and 9 show this process of the spent pod being removed from the brewing process, and when the cover 1 is lifted to insert a new pod therein.

Figure 10:
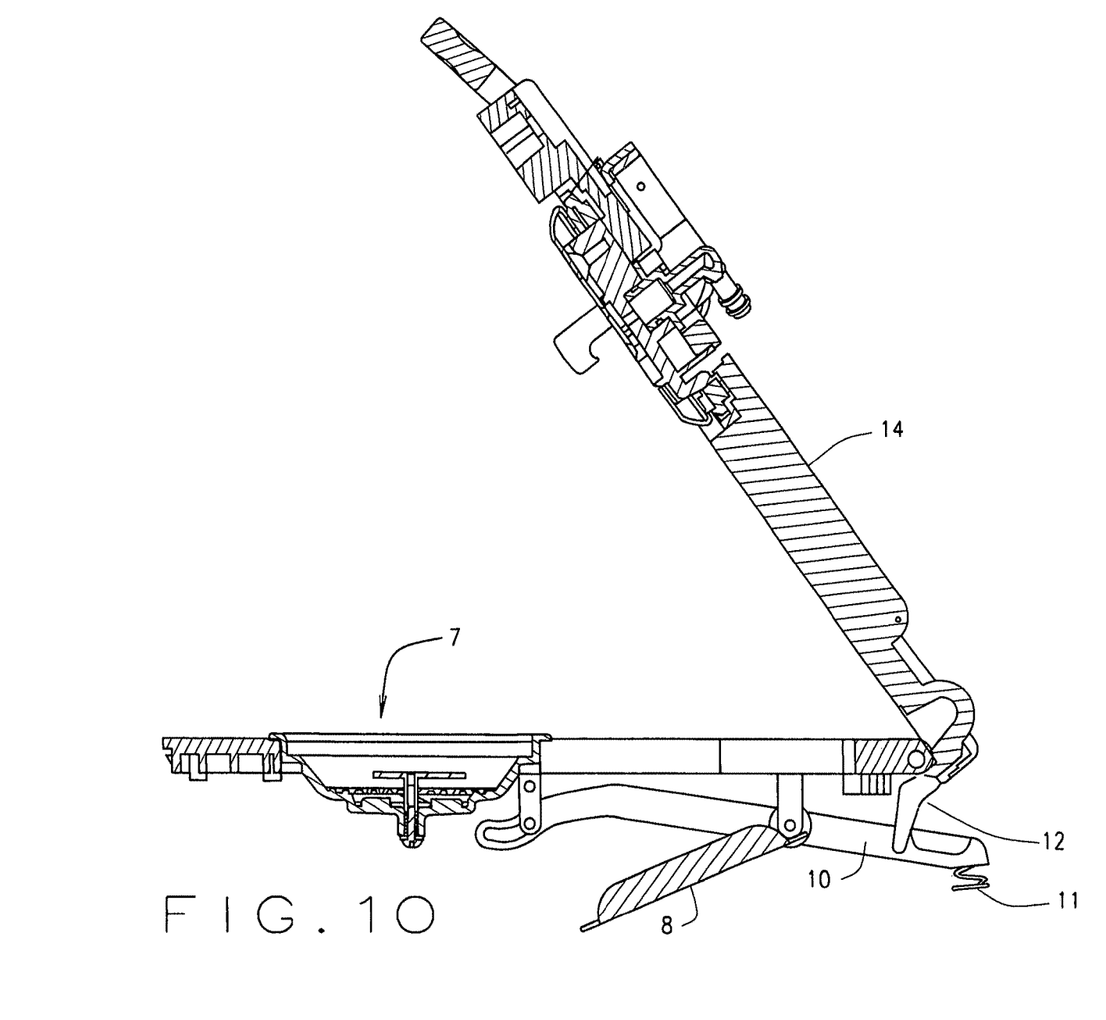
FIG. 10 provides a cross sectional view of the continued upward movement of the upper brew housing, at the apex of its lift, and the lift release tab has released the brew chamber lift arm and the spring force returns the lower pod brewing chamber to its initial horizontal position.

FIG. 10 depicts the return of the pod holder 7 by spring force which presents an empty pod holder ready to accept a fresh pod for another brewing cycle. This figure depicts a cross sectional view of the continued upward travel of the upper brew housing 14. At the apex of its lift, when completed, the lift release tab 12 surface releases from the brew chamber lift arm 10 and the spring force 11 returns the lower pod brewing chamber to its horizontal position. The spent coffee pod 8 is then released from the lower pod brewing chamber, and is directed into a waste bin, as explained.

Figure 11:
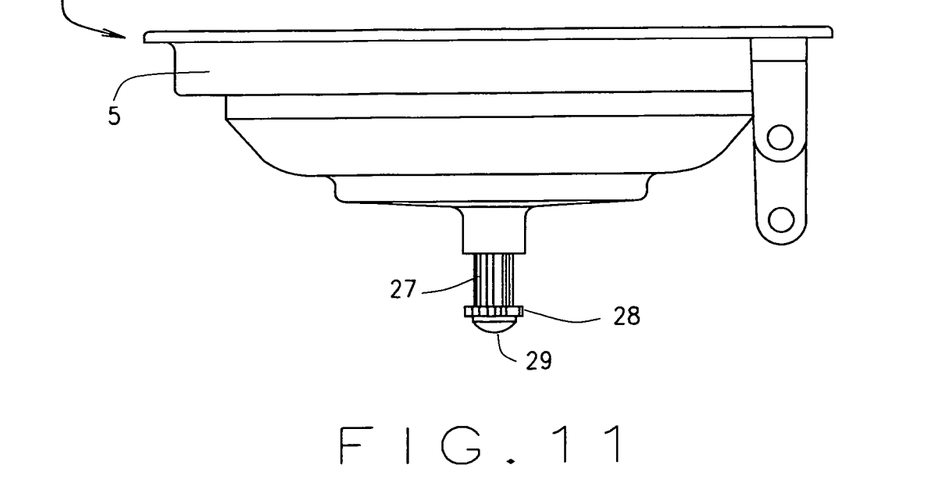
FIG. 11 shows the lower brew chamber housing that supports a beverage pod.
Figure 12:
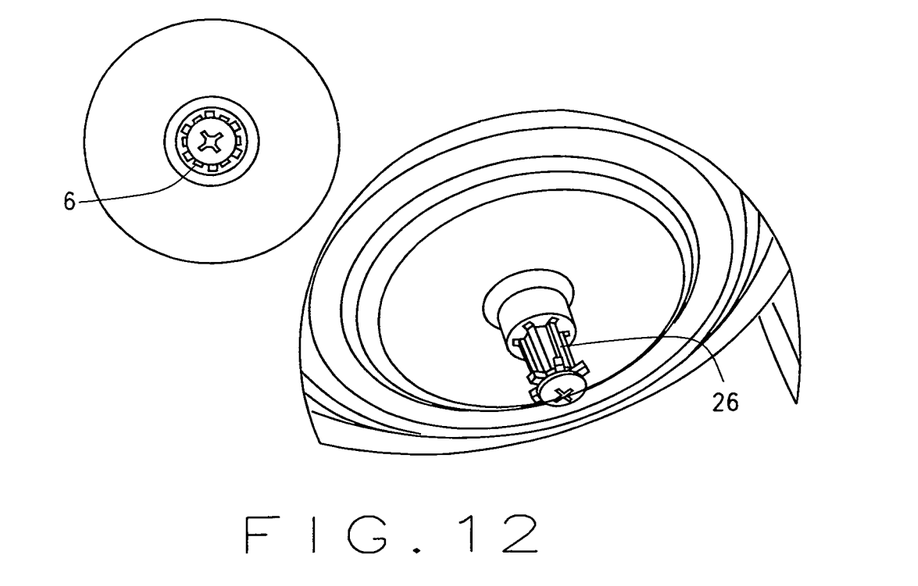
FIG. 12 shows the over sized grooves in the lower brew chamber housing that conveniently provides an opening for the liquid beverage to flow out of the housing during the brewing and after the completion of a brewing process.

FIGS. 11 and 12 depict the arrangement of the pod support 27 travel, and the ribs 26 and corresponding grooves 6 provided between the pod holder 5 and the pod support. You should note the grooves are cut at a larger diameter radius than the ribs in the pod support to allow the brewed liquid to pass through the pod holder and into a receiving container.

FIG. 11 specifically depicts the lower brew chamber housing 7 showing the relationship of the pod support 27, the pod holder 5 and the retaining washer 28 and screw 29. This arrangement allows the pod support ribs 26 to slide vertically inside grooves 6 of the lower brew chamber housing 7. And, FIG. 12 shows the oversized grooves 6 in the lower brew chamber housing 7. The oversized grooves allow an opening for the beverage liquid to flow out of the lower brew chamber housing 7. The pod support ribs 26 corresponding to the lower brew chamber housing grooves are further disclosed.

Variations or modifications to the subject matter of this invention may occur to those skilled in the art upon review of the preferred embodiment as explained herein. Such variations, if within the spirit of this invention, are intended to be encompassed within the scope of any claims to patent protection issuing herein. The detailed description of the invention as provided herein, and the disclosure of the invention as depicted in the drawings, are set forth for illustrative purposes only.

What is claimed is:

1. A beverage brewing device for use for brewing a beverage from a beverage packet, comprising:

said brewing device having a lower frame, an upper frame pivotally connecting with said lower frame, said lower frame incorporating a lower pod holder, said upper frame incorporating an upper pod seal, which when a beverage pod is located within the pod holder, and the upper frame is pivoted into closure upon the lower frame, the beverage pod is sealed in preparation for a brewing operation;

a latch means interconnecting between the lower frame and said upper frame to secure the two frames together during a brewing function;

a lift arm pivotally mounting to said lower frame, said lift arm at its frontal end operatively engaging with the pod holder of said lower frame, the back end of said lift arm disposed for cooperating with the back of the upper frame such that when said upper frame is elevated, upon completion of a brewing function, the lift arm pivots the pod holder into a beyond vertical position for discharging the spent pod for disposal;

the lower pod holder incorporating lift means to urge the emplaced beverage pod against the upper frame seal, said upper frame seal having water disseminating channel provided therethrough for delivering heated water to the device in preparation for a brewing operation;

said lift means operatively associated with the pod holder of the lower frame includes a pod support, said pod support including a platform for holding the beverage pod thereon in preparation for a brewing cycle, a downwardly extending stem connecting with the said platform, a spring biasing said stem and platform upwardly, for urging any supported beverage pod upwardly into contact with the upper frame seal, to assure that heated water entering into the pod support disseminates upon the emplaced beverage pod to assure that complete beverage brewing occurs;

a hot water inlet connecting with the upper frame and extending through the upper pod seal for delivering hot, water through the upper frame and the pod seal for delivery to the beverage pod during a brewing operation;

said pod support stem is formed with integral ribs, and said lower pod support having a spout provided therethrough, and through which the ribs of said stem locate, in order to position the pod support relative to the lower pod holder during its functioning.

2. The beverage brewing device of claim 1, wherein said lower pod support spout having a series of grooves, to accommodate the location of the stem ribs therein, when assembled for usage.

3. The beverage brewing device of claim 1, and including said lift arm having a cam surface at its front end, for engagement with the lower pod support, which when said lift arm is pivoted, said cam actuates said pod holder into a pivotal movement, and into an over vertical position to attain a discharge of a spent pod after a brewing cycle.

4. The beverage brewing device of claim 3, wherein the back end of the lift arm has a contoured surface for engagement with the back end of the upper frame to attain a pivoting of said lift arm upon completion of a brewing cycle.

5. The beverage brewing device of claim 4, wherein the back end of the upper frame incorporates a lift tab and said lift tab provided for engagement with the contoured surface at the back end of the lift arm for actuation of said lift arm into a pivotal movement as the upper frame is raised upon completion of a brewing cycle.

6. The beverage brewing device of claim 5, and including a biasing spring encountering the back end of the lift arm, to force it into an upward pivot movement, after a spent pod has been discharged, and a new beverage pod located therein, to pivot the pod holder back into it brewing position, as the upper frame pivots into a horizontal position for sealing of the pod holder in preparation for another brewing cycle.

7. The beverage brewing device of claim 1, and including a handle, operatively associated with the upper frame, to provide for a manual lifting of the upper frame upon completion of a brewing cycle.

8. The beverage brewing device of claim 7, wherein said device through its handle is manually operative.

9. The beverage brewing device of claim 1, wherein said upper frame is pivoted upwardly, upon completion of a brewing cycle, automatically.

10. The beverage brewing device of claim 2, wherein substantial clearance is provided between the spout grooves and the stem ribs to allow for substantially free flow of a brewed beverage through said spout and into a container there below.

* * * * *